United States Patent
Kwan et al.

(10) Patent No.: US 10,142,951 B2
(45) Date of Patent: Nov. 27, 2018

(54) SYNCHRONIZATION OF LICENSED ASSISTED ACCESS LONG TERM EVOLUTION (LAA-LTE) OVER SHARED SPECTRUM

(71) Applicant: Cisco Technology, Inc., San Jose, CA (US)

(72) Inventors: Raymond Yuk Chor Kwan, Swindon (GB); Peter Keevill, Bath (GB); James Paul Seymour, Long Grove, IL (US); Rajesh Pazhyannur, Fremont, CA (US); Patrick Georges Venceslas Charriere, Letcombe Regis (GB)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 15/147,286

(22) Filed: May 5, 2016

(65) Prior Publication Data

US 2017/0325184 A1    Nov. 9, 2017

(51) Int. Cl.
*H04W 56/00* (2009.01)
*H04L 5/00* (2006.01)
*H04L 1/18* (2006.01)
*H04W 28/26* (2009.01)

(52) U.S. Cl.
CPC ......... *H04W 56/001* (2013.01); *H04L 1/1812* (2013.01); *H04L 5/0048* (2013.01); *H04L 5/0032* (2013.01); *H04W 28/26* (2013.01)

(58) Field of Classification Search
CPC ............... H04W 56/001; H04W 28/26; H04W 72/0406; H04W 72/1278; H04W 74/02; H04W 74/08; H04L 1/1812; H04L 5/0048; H04L 5/0032

USPC ......................................................... 370/350
See application file for complete search history.

(56) References Cited

U.S. PATENT DOCUMENTS

| | | | |
|---|---|---|---|
| 9,717,087 B2 * | 7/2017 | Zhang | H04W 72/0406 |
| 9,794,033 B2 * | 10/2017 | Fwu | H04L 5/0001 |
| 2014/0185497 A1 * | 7/2014 | Wolf | H04W 28/26 |
| | | | 370/294 |
| 2015/0023315 A1 | 1/2015 | Yerramalli et al. | |
| 2015/0049709 A1 | 2/2015 | Damnjanovic et al. | |
| 2015/0055541 A1 | 2/2015 | Zhang et al. | |

(Continued)

OTHER PUBLICATIONS

Matt Branda, "Introducing MulteFire: LTE-like performance with Wi-Fi-like simplicity", Qualcomm Technologies, Inc., OnQ Blog, www.qualcomm.com/wireless, Jun. 11, 2015, 7 pages.
"Physical Layer options for LAA-LTE", Motorola Mobility, Agenda item 6.3.2.2, 3GPP TSG RAN WG1 #79, Nov. 17-21, 2014, San Francisco, USA, R1-145123, 2 pages.
"Candidate Solutions for LAA-LTE", Qualcomm Incorporated, Agenda item 6.3.2.2, 3GPP TSG RAN WG1 #79, Nov. 17-21, 2014, San Francisco, USA, R1-145084, 7 pages.

(Continued)

*Primary Examiner* — Un C Cho
*Assistant Examiner* — Shah M Rahman
(74) *Attorney, Agent, or Firm* — Edell, Shapiro & Finnan, LLC

(57) ABSTRACT

An LAA-LTE wireless device obtains data to be transmitted in subframes over a shared spectrum. The wireless device transmits a reservation message over the shared spectrum. The reservation message indicates that an initial synchronization message will be retransmitted a specified number of times at specified intervals, such as with a predetermined number of subframes between each retransmitted synchronization message. The wireless device transmits the initial synchronization message over the shared spectrum.

19 Claims, 7 Drawing Sheets

(56) References Cited

U.S. PATENT DOCUMENTS

| | | | | |
|---|---|---|---|---|
| 2015/0063327 | A1* | 3/2015 | Barriac | H04W 56/0005 370/337 |
| 2015/0223075 | A1* | 8/2015 | Bashar | H04W 16/14 370/329 |
| 2015/0250002 | A1 | 9/2015 | Sun et al. | |
| 2015/0264699 | A1* | 9/2015 | Fwu | H04L 5/0001 370/329 |
| 2016/0174078 | A1* | 6/2016 | Salem | H04W 16/14 370/329 |
| 2016/0302179 | A1* | 10/2016 | Gupta | H04W 72/044 |
| 2017/0048041 | A1* | 2/2017 | Yi | H04L 5/0048 |
| 2017/0055263 | A1* | 2/2017 | Tomeba | H04W 16/14 |
| 2017/0142746 | A1* | 5/2017 | Koorapaty | H04W 72/1242 |
| 2017/0238272 | A1* | 8/2017 | You | H04W 56/0015 370/350 |
| 2017/0238311 | A1* | 8/2017 | Hooli | H04W 72/0446 370/329 |
| 2017/0290029 | A1* | 10/2017 | Park | H04W 72/12 |
| 2017/0353912 | A1* | 12/2017 | Einhaus | H04W 48/12 |

OTHER PUBLICATIONS

"Measurement and Synchronization for LAA-LTE" HTC, Agenda item 6.3.2.2, 3GPP TSG RAN WG1 Meeting #79, San Francisco, USA, Nov. 17-21, 2014, R1-144928, 2 pages.

"CSI feedback and handling interference variation in unlicensed band", LG Electronics, Agenda item 6.3.2.2, 3GPP TSG RAN WG1 Meeting #79, San Francisco, USA, Nov. 17-21, 2014, R1-144902, 5 pages.

"Discussion on CSI measurement aspects for LAA", Samsung, Agenda item 6.3.2.2, 3GPP TSG RAN WG1 #79, San Francisco, USA, Nov. 17-21, 2014, R1-144743, 3 pages.

"Discussion on PHY layer options for LAA using LTE", Intel Corporation, Agenda item 6.3.2.2, 3GPP TSG RAN WG1 Meeting #79, San Francisco, USA, Nov. 17-21, 2014, R1-144666, 6 pages.

"Required Functionalities for supporting RRM, CSI and Time-Frequency Tracking", Ericsson, Agenda item 6.3.2.2, 3GPP TSG RAN WG1 Meeting #79, San Francisco, USA, Nov. 17-21, 2014, R1-144779, 2 pages.

* cited by examiner

SYNCHRONIZATION OF LICENSED ASSISTED ACCESS LONG TERM EVOLUTION (LAA-LTE) OVER SHARED SPECTRUM

TECHNICAL FIELD

The present disclosure relates to wireless networks.

BACKGROUND

The use of Long Term Evolution (LTE) wireless communication in unlicensed bands is being standardized as part of the Third Generation Partnership Project (3GPP) Release 13 as Licensed Assisted Access LTE (LAA-LTE). As part of LAA-LTE, it has been agreed that LTE access to the unlicensed band, i.e., unlicensed spectrum, will use support through Carrier Aggregation (CA) with a licensed band LTE carrier. The LTE primary component carrier in the licensed band is aggregated through CA with an LTE secondary component carrier in the unlicensed band. The primary carrier contains scheduling and control channels for scheduling user plane traffic across both the licensed band primary and unlicensed band secondary carrier. Thus, the secondary carrier in the unlicensed band will typically carry user plane traffic, and may be shut off when no traffic is required over the unlicensed band carrier in order to minimize interference to other systems operating in the same unlicensed band, e.g., Wi-Fi® equipment.

For LAA-LTE User Equipment (UE) to synchronize to the secondary carrier in the unlicensed band, an LAA-LTE access point, e.g., evolved node B (eNB), transmits a Primary Synchronization Signal (PSS), a Secondary Synchronization Signal (SSS), and a Common Reference Signal (CRS) at periodic intervals. Typically, the PSS and SSS are sent every five subframes (i.e., every 5 milliseconds), and the CRS is sent every subframe. LTE UEs rely on the PSS to initially time synchronize at the subframe level. Once synchronized at the subframe level, the UE can read the SSS to obtain the Physical Cell Identifier (PCI) for the LTE carrier. One the UE reads the SSS, it knows the location of the CRS for doing channel estimation. In normal LTE operation, the PSS, SSS, and CRS are transmitted continuously, even on the secondary component carrier when there is no user plane data to send.

UE cell search and channel estimation are important components of a wireless network. These processes are typically aided by control signals, such as PSS/SSS and CRS, which are transmitted periodically. However, due to the uncertainty of channel availability in the unlicensed band, the exact transmission timing of these signals cannot be guaranteed, thereby degrading the performance of the entire process.

DESCRIPTION OF EXAMPLE EMBODIMENTS

Overview

Figure 1:
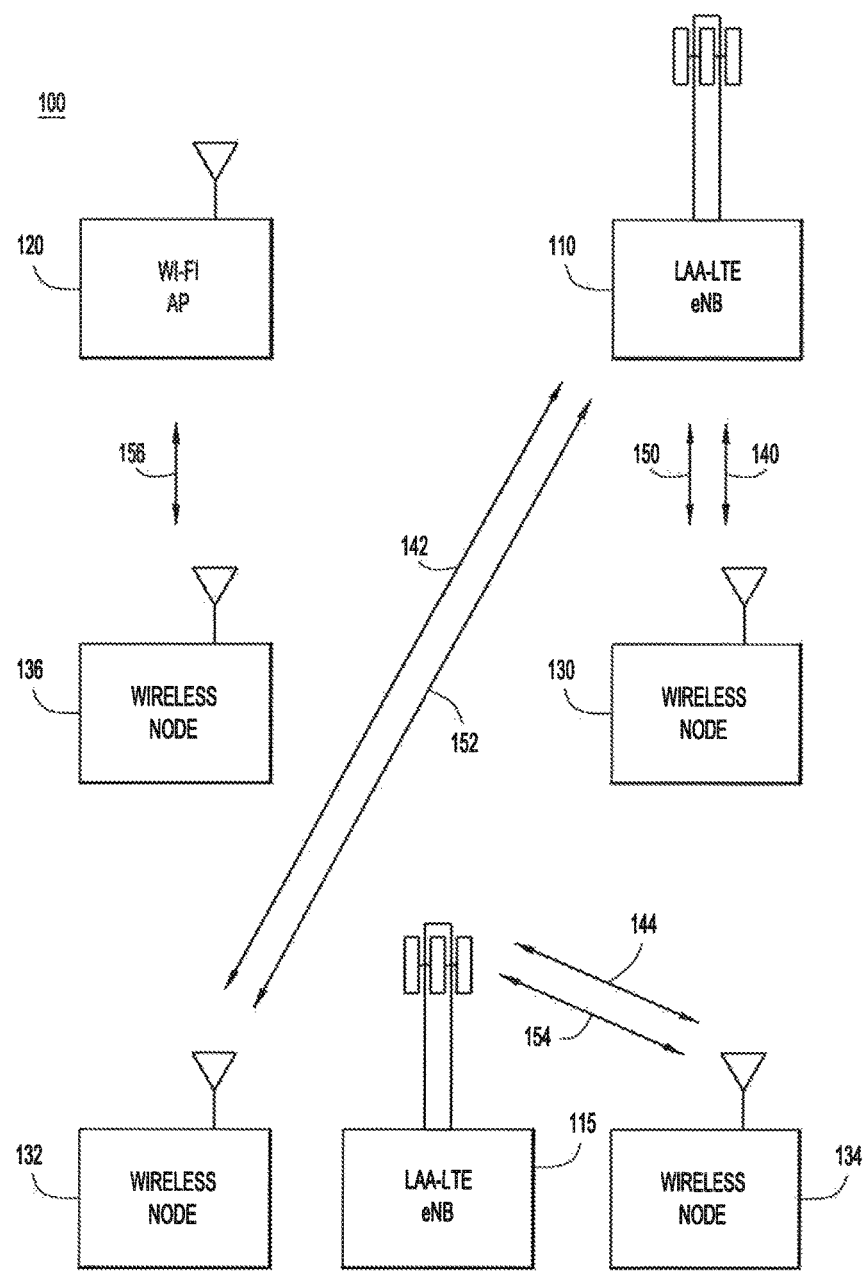
FIG. 1 is a system block diagram illustrating a wireless transmission system configured to use reservation logic over an unlicensed spectrum to facilitate carrier synchronization and mitigate interference between LAA-LTE and Wi-Fi systems, according to an example embodiment.

Methods are presented herein for reserving periodic time slots in a shared spectrum to transmit synchronization signals. In one embodiment, the method involves, at a wireless device, obtaining data to be transmitted in a plurality of subframes over a shared spectrum. The wireless device transmits a first reservation message over the shared spectrum. The first reservation message indicates that an initial synchronization message will be retransmitted as a plurality of retransmitted synchronization messages. The first reservation message also indicates that the plurality of retransmitted synchronization messages will be retransmitted with a predetermined number of subframes between each retransmitted synchronization message. The wireless device transmits the initial synchronization message over the shared spectrum.

DETAILED DESCRIPTION

Wi-Fi and other unlicensed band radio access technologies have typically operated in a non-synchronous, autonomous fashion. Thus, preamble lengths and reference symbol overhead in Wi-Fi systems was designed for with this challenge in mind. In contrast, LTE includes pre-defined periodic synchronization signals that reduce the overhead of a single transmission (e.g., fewer pilot tones are needed per subframe since the receiver can use pilot tones from adjacent subframes). Changing the CRS pattern in LTE to better accommodate asynchronous, bursty transmissions would likely be a major change to the LTE standards. The techniques presented herein introduce a method that largely preserves the time synchronizations and channel estimation techniques already in use in LTE without decreasing efficiency (i.e., not increasing pilot tone overhead), and may improve co-existence between future Wi-Fi access points and clients.

Due to the contention-based access characteristics of the unlicensed band, an LAA-LTE access point may be able to transmit the first subframe of PSS, SSS, and CRS, but not have access to the channel exactly 5 milliseconds later (or at any specifically defined periodic interval) to retransmit the PSS, SSS, and CRS. The channel may be busy at the later times serving other LAA-LTE access points, or possibly Wi-Fi access points.

A single transmission of the PSS and SSS does not guarantee that the UEs will be able to detect and decode these signals since the UEs typically need to frequency synchronize to the secondary component carrier when it initially appears. Additionally, most UEs will typically use multiple subframes of CRS to improve the channel estimation performance, such that a single subframe of CRS will likely lead to poor channel estimation.

Additionally, in potential future versions of LAA-LTE, access points and UEs may operate in a standalone mode in the unlicensed band without the need for carrier aggregation with a licensed band carrier. The standalone mode will require additional control signals (e.g., Physical Broadcast Channel (PBCH), Physical Control Format Indicator Channel (PCFICH), Physical Downlink Control Channel (PDCCH), and Physical Hybrid Automatic Repeat Request Indicator Channel (PHICH)) to be transmitted periodically in the unlicensed band. Typically, some of the control signals are sent in the first few symbols of every subframe in an LTE system.

The techniques presented herein provide for a mechanism for each of the control signals normally transmitted periodically on the licensed frequency band throughout the operation of an LAA-LTE access point, to be transmitted less frequently, but still periodically, when transmitted in the unlicensed band. This allows the LAA-LTE access point to share the unlicensed band with other transmitters, but still synchronize UEs that connect to the LAA-LTE access point to the carrier on the unlicensed band.

Additionally, the techniques presented herein may lead to a self-coordination across a cluster of LAA-LTE access points for the transmission of PSS/SSS/CRS information. In one example, a first LAA-LTE access point indicates that it will be sending the PSS/SSS/CRS at times 0, 5, and 10 ms. A second LAA-LTE access point in the area may detect this reservation and, avoiding these time slots, indicate that it will send PSS/SSS/CRS at times 1, 6, and 11 ms. A third LAA-LTE access point in the area detects both of these reservations and thus sends PSS/SSS/CRS information at times 2, 7, and 12 ms. By each nearby LAA-LTE access point sending PSS/SSS/CRS information on different subframes, interference between the LAA-LTE access points is greatly reduced. This also reduces PSS/SSS confusion, i.e., a UE decoding the PSS/SSS from the wrong LAA-LTE access point, and improves the quality of CRS for channel estimation.

Referring now to FIG. 1, a system block diagram illustrates examples of scenarios in which the methods presented herein may be used. LAA-LTE access points 110 and 115, such as evolved nodes B (eNBs), and a Wi-Fi access point 120, communicate with wireless nodes 130, 132, 134, and 136. In one example, one or more of the wireless nodes 130, 132, 134, and 136 may be capable of communicating across multiple technologies. LAA-LTE eNB 110 sends and receives communications 140 with wireless node 130 over a licensed frequency band. Similarly, LAA-LTE eNB 110 sends and receives communications 142 with wireless node 132 over the same licensed frequency band. LAA-LTE eNB 115 sends and receives communications 144 with wireless node 134 over a licensed frequency band. In one example, the licensed frequency band for communications 140 and 142 may be different from the licensed band for communications 144, e.g., if LTE-LAA eNB 110 is operated by a different entity than the LTE-LAA eNB 115. Alternatively, the communications 140, 142, and 144 may use the same licensed frequency band scheduled in different time slots.

LAA-LTE eNB 110 sends and receives communications 150 with wireless node 130 over an unlicensed frequency band, i.e., a shared spectrum. The LAA-LTE eNB 110 sends and receives communications 152 with wireless node 132 over the same shared spectrum. LAA-LTE eNB 115 sends and receives communications 154 with wireless node 134 over the shared spectrum. Additionally, the Wi-Fi access point 120 sends and receives Wi-Fi communications 150 with wireless node 136 over the shared spectrum. The LAA-LTE devices 110 and 115, the Wi-Fi access point 120, and the wireless nodes 130, 132, 134, and 136 are all in sufficient proximity that there may be interference between signals transmitted over the shared frequencies.

In order to assist the wireless nodes 130, 132, and 134 in synchronizing to the unlicensed component carrier for communications 150, 152, and 154, a channel reservation mechanism reserves the channel in advance across multiple time periods. A Clear-To-Send(CTS)-To-Self mechanism indicates that synchronization information (e.g., PSS, SSS, and CRS) will be sent at specific intervals in the future. The CTS-To-Self mechanism is similar to the mechanism used in Wi-Fi for an access point or client to indicate to all of the other access points and clients in its vicinity, that the access point or client is going to use the channel for a specified contiguous period of time. In the techniques presented herein, a similar CTS-To-Self message is transmitted by an LAA-LTE access point, with an extension that indicates that the same synchronization information will be sent a specific number of times (e.g., three times) at specific intervals (e.g., every five milliseconds).

Legacy Wi-Fi access points and clients, such as access point 120 and wireless node 136, may not recognize this new extension to the CTS-To-Self message, and a CTS-To-Self message may need to be sent at each interval that the synchronization information is sent. However, co-existence between different LAA-LTE access points (e.g., eNB 110 and eNB 115) is managed through the receipt and recognition of the extension to the CTS-To-Self message. For instance, the advance reservation extension prevents a situation in which LAA-LTE access point 110 sends synchronization signals, but five milliseconds later the LAA-LTE access point 115 grabs the channel and blocks the LAA-LTE access point from retransmitting the synchronization signal. By receiving the advance reservation message included by the LAA-LTE access point 110, the LAA-LTE access point 115 recognizes the reservation of the channel and will only contend for access in the gap periods between the scheduled reservations.

Figure 2:
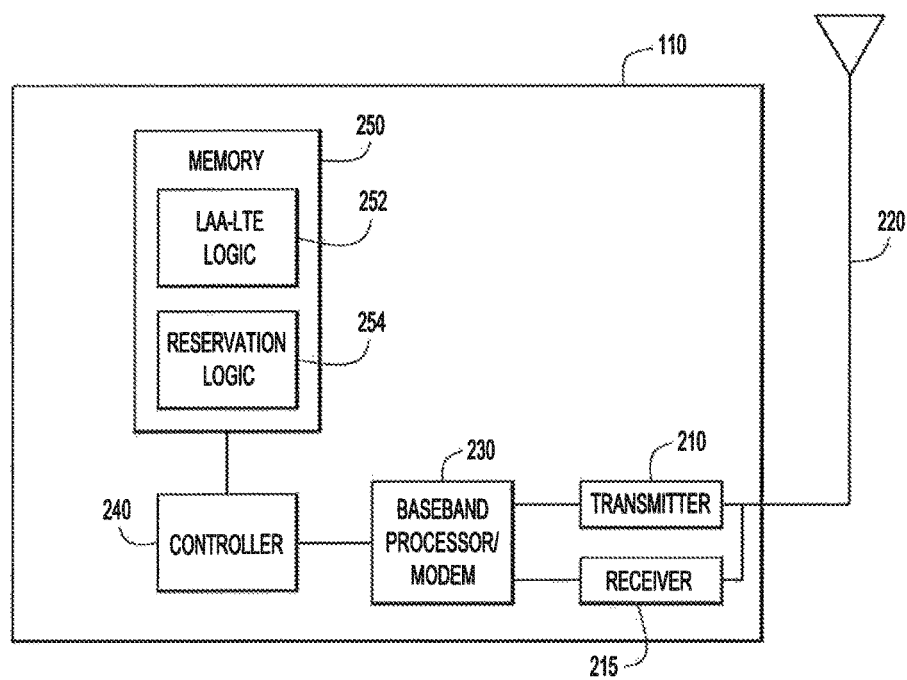
FIG. 2 is a simplified block diagram of an LTE device that may be configured to perform the methods presented herein, according to an example embodiment.

Referring now to FIG. 2, a simplified block diagram illustrates a wireless device, e.g., LAA-LTE access point 110, configured to perform the methods presented herein. The LAA-LTE access point 110 is shown as an example of a wireless device, but other wireless devices (e.g., wireless node 130) may include similar components that perform similar methods. The wireless device 110 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The receiver 215 may comprise one or more receivers with the capability to detect signals according to a plurality of formats, e.g., Wi-Fi and LAA-LTE signals. The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., LAA-LTE logic 252, reservation logic 254) and executed by the controller 240. The memory 250 may also store data (e.g., courtesy parameters 256, success index 258, etc.) related to the control logic. Additionally, the wireless device 110 may include a wired network interface unit (not shown) to communicate with other computing devices over a wired network.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3:
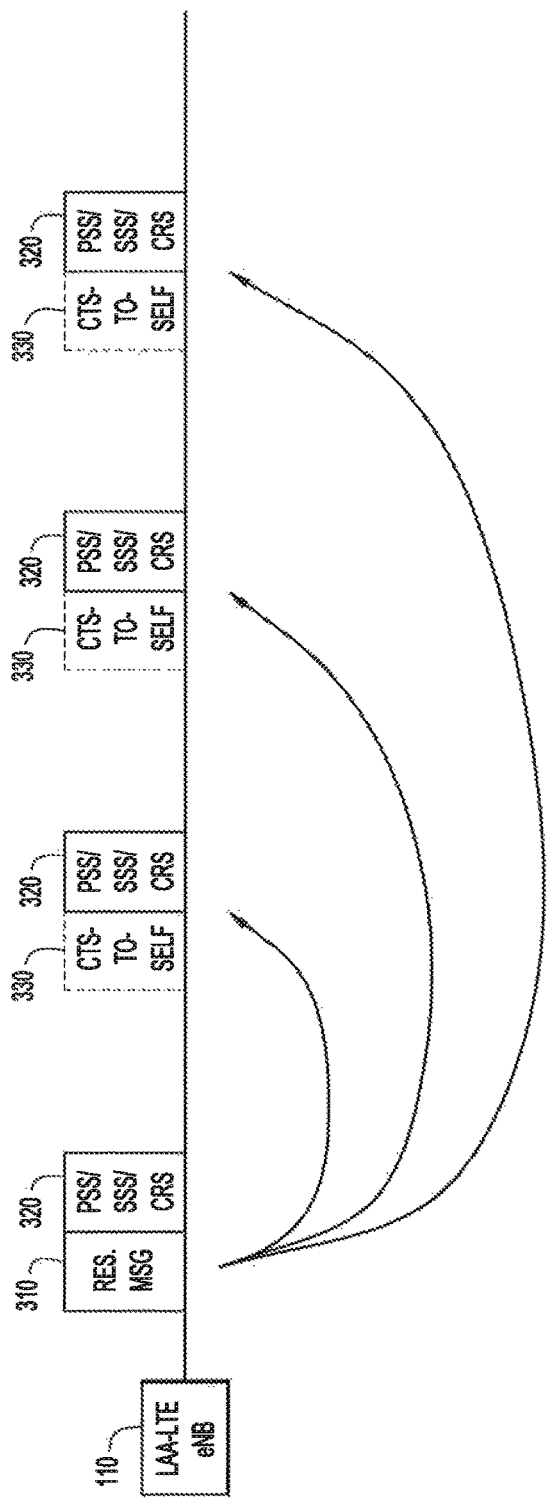
FIG. 3 illustrates an LAA-LTE device transmitting reservation and synchronization signal(s) in accordance with a method presented herein.

Referring now to FIG. 3, an example of an LAA-LTE access point transmitting a reservation message and synchronization signals is shown. After obtaining data to transmit across the unlicensed band, i.e., the shared spectrum, the LAA-LTE eNB 110 transmits a reservation message 310 on the shared spectrum. The reservation message 310 includes a CTS-To-Self message as well as a reservation of the channel for specific times in the future. The CTS-To-Self message grabs the shared spectrum and indicates to other transmitters that LAA-LTE eNB 110 will be transmitting immediately following the CTS-To-Self message. The reservation portion of the message 310 signals that the LAA-LTE eNB 110 will be transmitting at specified times in the future, but not necessarily contiguously. In one example, the reservation message 310 indicates that the LAA-LTE eNB 110 will retransmit synchronization signals 320, e.g., PSS, SSS, and CRS, three times at five millisecond intervals.

In order to notify legacy wireless transmitters, which may not recognize the reservation portion of the message 310, the LAA-LTE eNB 110 transmits a second reservation message 330 (i.e., another CTS-To-Self message) to grab the shared channel before each of the retransmissions of the synchronization signals 330. In one example, the CTS-To-Self message 330 does not include any future reservation information, relying on the reservation information previously transmitted in message 310 to reserve the shared spectrum. Alternatively, the LAA-LTE eNB may forgo the transmission of any explicit CTS mechanism before the scheduled retransmissions of the synchronization signals 320.

In another example, the LAA-LTE eNB 110 may include reservation information in one or more of the CTS-To-Self messages 330, but decrementing the number of reserved time slots with each retransmission of the synchronization signals 320. In other words, the first retransmission of the synchronization signals 320 may be preceded with a CTS-To-Self messages and a reservation for two more retransmissions at five millisecond intervals. This provides a redundancy in the reservation information in case the initial reservation message 310 was not received by a potentially interfering transmitter.

Insuring the periodic retransmission of synchronization signals 320 for three or more time intervals (e.g., 5 milliseconds) will greatly improve the ability for the LAA-LTE UEs to time synchronize to the unlicensed band carrier and perform good channel estimation, particularly for indoor or low mobility UEs where the channel characteristics do not change greatly over 15 milliseconds. Additionally, new generations of Wi-Fi access points and user devices may take advantage of the future channel reservations provided by the reservation message 310 to avoid collisions and improve co-existence.

While FIG. 3 shows the LAA-LTE eNB 110 reserving time on the shared spectrum for three retransmissions of the synchronization signals 320, any number of retransmissions may be indicated to provide adequate carrier synchronization to associated UEs. Additionally, the interval between the retransmission of the synchronization signal may be more or less than 5 milliseconds, e.g., to accommodate a fairness algorithm in sharing the unlicensed frequency band.

Additional control signals (e.g., PBCH, PDDCH, PCFICH, and PHICH) that are typically transmitted periodically in an LTE frame/subframe structure may also be included with the synchronization signals 320. These control signals may be included in every retransmission of the synchronization signals 320 or in a subset of the retransmissions, e.g., every other one. Alternatively, the LAA-LTE eNB may reserve time slots in the shared spectrum specifically for these control signals without the PSS, SSS, or CRS synchronization signals. For control signals that are typically transmitted every subframe, reserving the shared spectrum for multiple consecutive subframes would cause the shared spectrum to be reserved for the entire time that the eNB 110 has data to send. To accommodate fair sharing of the shared spectrum, changes to the LTE standard may allow for a reduced transmission periodicity of the PDCCH, PCFICH and PHICH signals when they are transmitted in unlicensed bands. The reservation techniques described herein can then be used to periodically reserve the unlicensed band channel at the rate at which the updated LTE standard specifies for the PDCCH, PCFICH, and/or PHICH.

Figure 4:
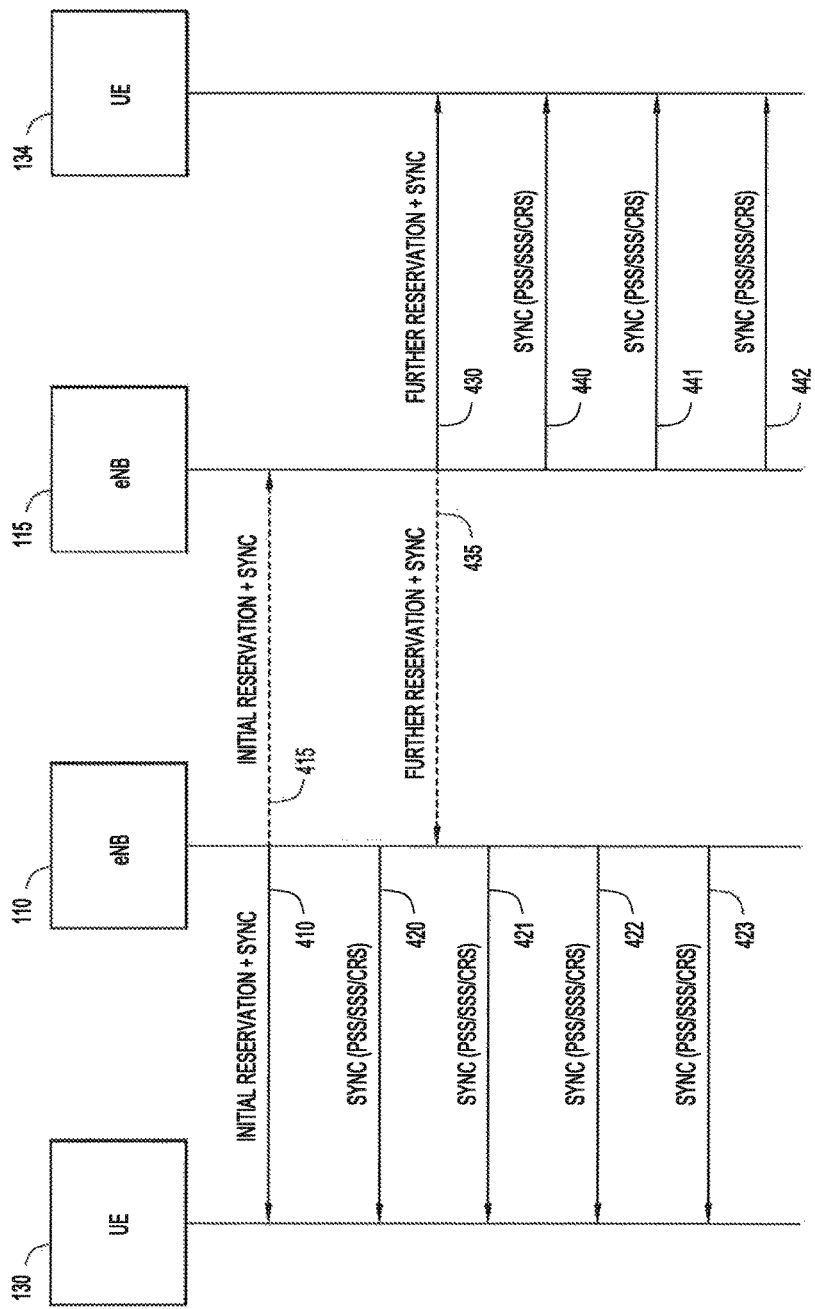
FIG. 4 is a sequence diagram that illustrates two LAA-LTE access points self-organizing transmission of their respective synchronization signals, according to an example embodiment.

Referring now to FIG. 4, a sequence diagram illustrates two LAA-LTE access points self-organizing and interleaving the transmission of synchronization signals on the shared spectrum. When the first LAA-LTE access point, e.g., eNB 110, has data to send to UE 130, it transmits an initial reservation message 410 on the shared spectrum to the UE 130. The initial reservation message 410 includes synchronization information (e.g., PSS, SSS, CRS, etc.) as well as an indication that the synchronization information will be transmitted an additional four times at specific intervals (e.g., every 5 milliseconds). The second LAA-LTE access point, e.g., eNB 115, overhears the initial reservation message 415 from the first eNB 110. After the time interval indicated in the reservation message 410, the first eNB retransmits the synchronization message 420. After each additional time interval specified in the reservation message 410, the first eNB transmits the synchronization messages 421, 422, and 423. The UE 130 uses the synchronization signals in the messages 410, 420, 421, 422, and 423 to synchronize to the carrier in the shared spectrum from the first eNB 110.

From the reservation information in the overheard reservation message 415, the second eNB 115 determines the time slots during which the first eNB 110 will be transmitting. When the second eNB 115 has data to send to UE 134, the eNB 115 determines appropriate time slots to send out a further reservation message 430 and retransmitted synchronization signals 440, 441, and 442. The further reservation message 430 includes synchronization information (e.g., PSS, SSS, CRS, etc.) and an indication that the synchronization information will be retransmitted an additional three times at specific intervals (e.g., every 5 milliseconds).

The first eNB 110 may also overhear the reservation message 435 and ensure that none of the retransmitted synchronization signals 421, 422, and 423 are scheduled to be transmitted during a time slot specified in the reservation message 435. Since the retransmitted synchronization messages 421, 422, and 423 are scheduled to interleave with the retransmitted synchronization signals 440, 441, and 442, the first eNB 110 and the second eNB 115 will be able to share the unlicensed/shared frequency band without interference.

In one example, one or both of eNB 110 and eNB 115 may detect that scheduled transmissions will overlap, e.g., if eNB 115 does not receive the initial reservation message 415 and schedules the synchronization messages 440, 441, and 442 such that they overlap with synchronization messages 421, 442, and/or 423. In this example, the eNB 110 and/or eNB 115 may reschedule their synchronization messages so as to prevent interfering with the other eNB's transmissions. Additionally, if eNB 110 detects a potential scheduling conflict, it may retransmit reservation information 410 to notify the eNB 115 and the UE 130 of any change in the timing of the retransmitted synchronization messages 420, 421, 422, and 423.

Figure 5:
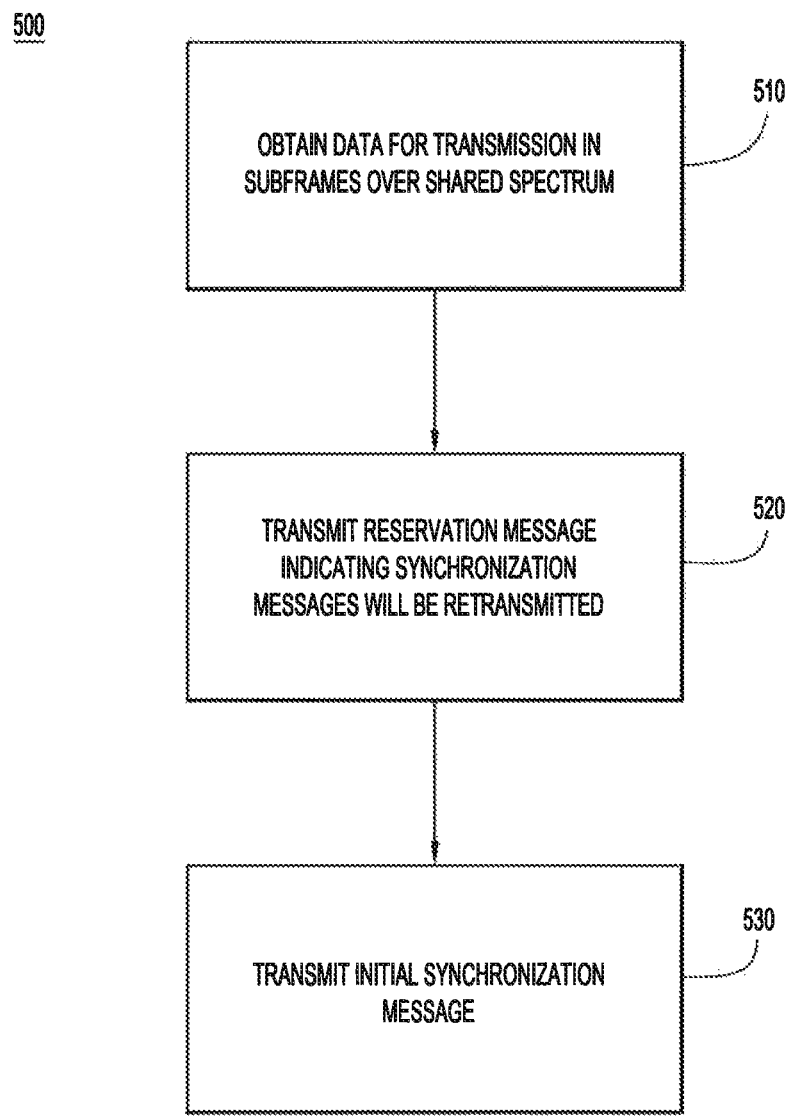
FIG. 5 is a flowchart illustrating operations of a wireless device in reserving the shared spectrum for synchronization signals, according to an example embodiment.

Referring now to FIG. 5, a flowchart illustrates operations performed by a wireless device (e.g., LAA-LTE access point 110) in a process 500 to broadcast a reservation for periodic retransmission of synchronization signals. In step 510, the wireless device obtains data for transmission in a frame/subframe structure over a shared spectrum (e.g., according to an LAA-LTE format). The shared spectrum comprises an unlicensed frequency band. In one example, the data may be directed to another wireless device over the unlicensed frequency band in association with a licensed frequency band through carrier aggregation.

In step 520, the wireless device transmits a reservation message indicating that synchronization messages will be retransmitted a predetermined number of times with a predetermined number of subframes between the retransmissions. In other words, the reservation message reserves the shared spectrum for the wireless device to periodically transmit synchronization messages, such as PSS, SSS, and CRS messages. In step 530, the wireless device transmits the initial synchronization message. In one example, the initial synchronization message includes a PSS, an SSS, a CRS, and one or more of a PBCH signal, a PDCCH signal, a PCFICH signal, or a PHICH signal.

Figure 6:
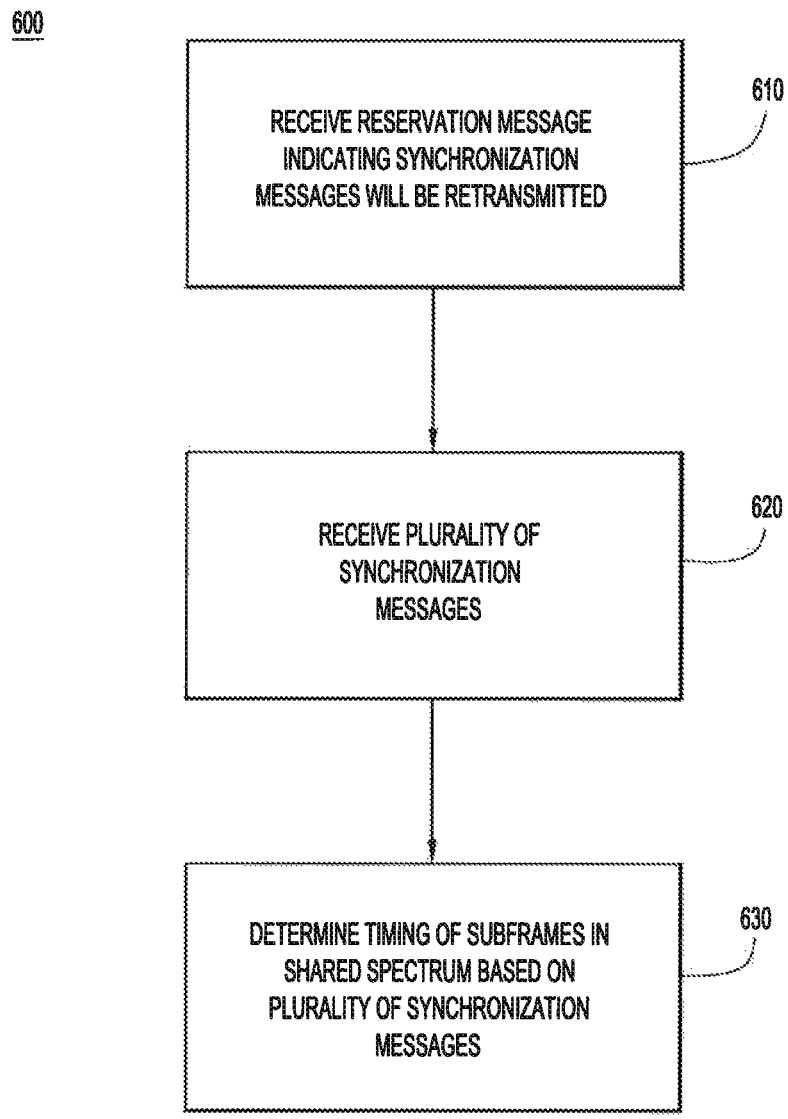
FIG. 6 is a flowchart illustrating operations of a wireless device in receiving signals to synchronize the timing of subframes in the shared spectrum, according to an example embodiment.

Referring now to FIG. 6, a flowchart illustrates operations performed by a wireless device (e.g., wireless node 130) in a process 600 to synchronize to a carrier in a shared spectrum. In step 610, the wireless device receives a reservation message over the shared spectrum indicating that an initial synchronization message will be retransmitted as a plurality of retransmitted synchronization messages. The synchronization messages include synchronization signals (e.g., PSS, SSS, CRS, etc.) for data to be transmitted in a plurality of subframes. In one example, the reservation message indicates that a predetermined number of subframes will occur between each of the plurality of retransmitted synchronization messages.

In step 620, the wireless device receives a plurality of synchronization messages. In one example, the plurality of synchronization messages includes an initial synchronization message received with the reservation message and at least one of the plurality of retransmitted synchronization messages. In step 630, the wireless device determines a timing of the plurality of subframes based on the plurality of synchronization messages. In one example, determining the timing of the subframes comprises decoding synchronization signals (e.g., PSS, SSS, CRS, etc.) from the plurality of synchronization messages to synchronize to the carrier on the shared spectrum.

Figure 7:
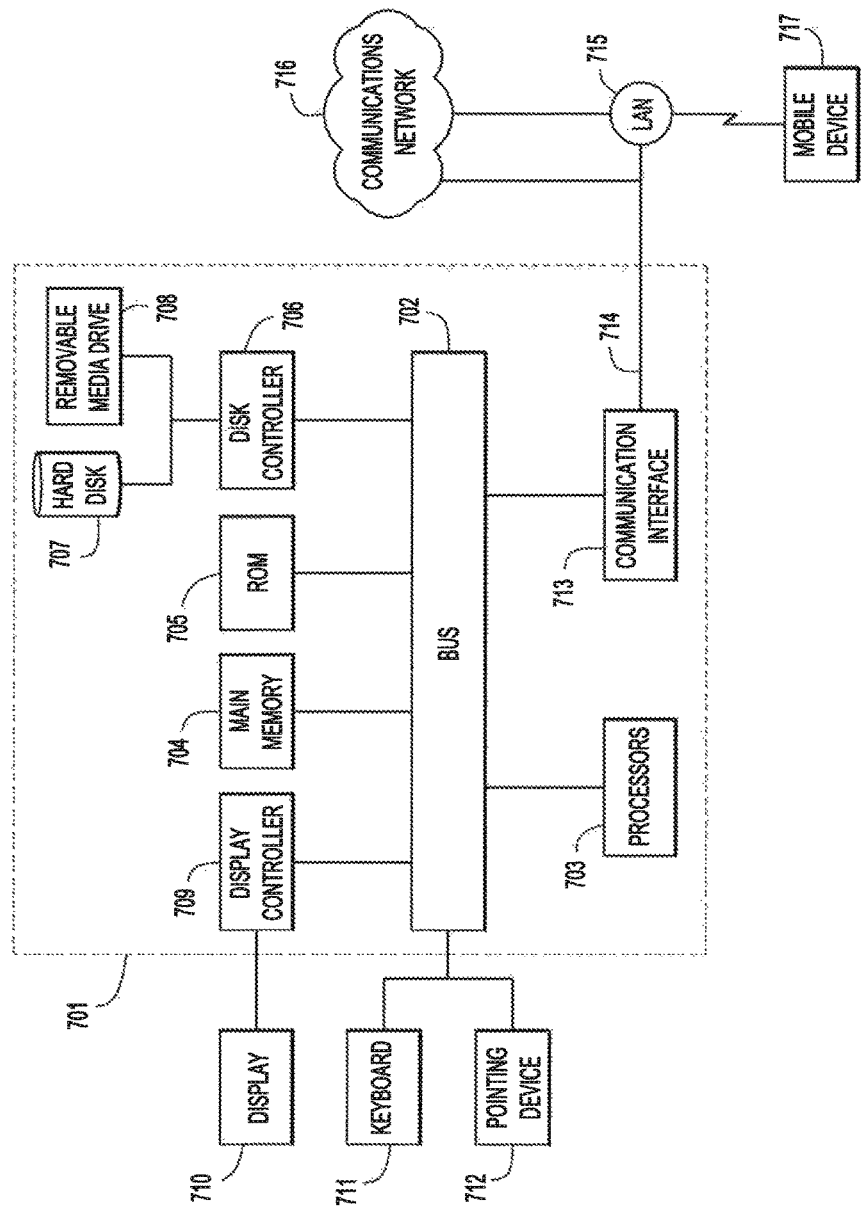
FIG. 7 illustrates a simplified block diagram of a device that may be configured to perform the methods presented herein, according to an example embodiment.

Referring now to FIG. 7, an example of a computer system 701 (e.g., a device equipped for wireless communication and other operations) upon which the embodiments presented may be implemented is shown. The computer system 701 may be programmed to implement a computer based device, such as a video conferencing endpoint or any device includes a video encoder or decoder for processing real time video images. The computer system 701 includes a bus 702 or other communication mechanism for communicating information, and a processor 703 coupled with the bus 702 for processing the information. While the figure shows a single block 703 for a processor, it should be understood that the processors 703 may represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive, solid state drive, etc.). The storage devices may be added to the computer system 701 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT), liquid crystal display (LCD) or light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, track pad, touch screen, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (e.g., wireless network administration personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA), laptop computer, or cellular telephone.

In summary, in order to assist the LAA-LTE UEs in synchronizing to an unlicensed component carrier, and to enable UEs to receive and decode signaling channels in the unlicensed band, the techniques presented herein introduce a channel reservation mechanism that reserves the channel in advance across multiple (e.g., periodic) time periods. The periodically transmitted short control bursts which include control signals that aid synchronization, cell search, and channel estimation (e.g., PSS, SSS, CRS, etc.) are protected via the use of a modified version of a CTS-To-Self message under which the transmission medium can be periodically reserved. In some examples, periodically transmitted broadcast, control, frame format, and Hybrid Automatic Repeat request (HARQ) indicator channels (e.g., PBCH, PDCCH, PCFICH, and PHICH) may be protected via the same modified CTS-To-Self messaging mechanism.

The proposed techniques are designed to solve the unpredictable nature of the shared spectrum/unlicensed band by proactively reserving the medium intelligently. This scheme may be incorporated into a cellular access network by the network equipment vendor to solve the unpredictability issue. Additionally, the techniques may be used by network equipment vendors to address the issue of transmitting broadcast, control frame format, and HARQ information in the shared/unlicensed band.

In one form, a method is provided for reserving periodic time slots in a shared spectrum to transmit synchronization signals. The method comprises, at a wireless device, obtaining data to be transmitted in a plurality of subframes over a shared spectrum. The wireless device transmits a first reservation message over the shared spectrum. The first reservation message indicates that an initial synchronization message will be retransmitted as a plurality of retransmitted synchronization messages. The first reservation message also indicates that the plurality of retransmitted synchronization messages will be retransmitted with a predetermined number of subframes between each retransmitted synchronization message. The wireless device transmits the initial synchronization message over the shared spectrum.

In another form, an apparatus is provided comprising a transmitter, a receiver, a modem, and a processor. The transmitter is configured to transmit wireless transmissions in a plurality of subframes over a shared spectrum. The receiver is configured to receive wireless signals in the shared spectrum. The modem is configured to modulate signals to be transmitted and demodulate received signals. The processor is configured to obtain data to be transmitted over the shared spectrum. The processor is also configured to generate a first reservation message indicating that an initial synchronization message will be retransmitted as a plurality of retransmitted synchronization messages. The first reservation message also indicates that the plurality of retransmitted synchronization messages will be retransmitted with a predetermined number of subframes between each retransmitted synchronization message. The processor is further configured to cause the transmitter to transmit the first reservation message and the initial synchronization message over the shared spectrum.

In yet another form, a method is provided for synchronizing a wireless device to a carrier component on a shared spectrum. The method comprises wirelessly receiving a first reservation message over the shared spectrum. The first reservation message indicates that an initial synchronization message for data to be transmitted over the shared spectrum will be retransmitted as a plurality of retransmitted synchronization messages. The first reservation message also indicates that the plurality of retransmitted synchronization messages will be retransmitted with a predetermined number of subframes between each retransmitted synchronization message. The method further comprises receiving a first plurality of synchronization messages over the shared spectrum. The first plurality of synchronization messages includes the initial synchronization message and at least one of the plurality of retransmitted synchronization messages. The wireless device determines the timing of the plurality of subframes (e.g., synchronizes to the carrier component in the shared spectrum) based on the plurality of synchronization messages.

In still another form, a non-transitory computer readable storage media is provided that is encoded with instructions that, when executed by a processor, cause the processor to perform any of the methods described and shown herein.

The above description is intended by way of example only. In particular, the techniques presented herein and described with respect to LAA-LTE devices and transmissions may also be used with respect to any type of LTE devices and transmissions that use unlicensed wireless spectrum, and are not intended to be limited to LAA-LTE implementations.

What is claimed is:

1. A method comprising:
   obtaining data to be transmitted in a plurality of subframes over a shared spectrum;
   transmitting a first reservation message over the shared spectrum to reserve a first portion in the shared spectrum, the first reservation message indicating that an initial synchronization message will be retransmitted as a plurality of retransmitted synchronization messages with a predetermined number of subframes between each of the plurality of retransmitted synchronization messages;
   receiving a second reservation message, the second reservation message reserving a second portion in the shared spectrum for a scheduled transmission of remote synchronization messages;
   transmitting the initial synchronization message and the plurality of retransmitted synchronization messages during the first portion in the shared spectrum interleaved with the remote synchronization messages during the second portion in the shared spectrum; and
   transmitting the data over the shared spectrum according to timing based on the first reservation message.

2. The method of claim 1, wherein the first reservation message is a Clear-to-Send (CTS)-To-Self message and indicates a total number of the plurality of retransmitted synchronization messages, and the predetermined number of subframes.

3. The method of claim 1, further comprising transmitting each of the plurality of retransmitted synchronization messages after waiting for the predetermined number of subframes.

4. The method of claim 3, wherein the transmission of each of the plurality of retransmitted synchronization messages is preceded by a transmission of a third reservation message comprising a Clear-to-Send (CTS)-To-Self message.

5. The method of claim 1, wherein transmitting the data over the shared spectrum comprises transmitting the data in the plurality of subframes over the shared spectrum in accordance with a Licensed Assisted Access Long Term Evolution (LAA-LTE) standard.

6. The method of claim 5, wherein the initial synchronization message comprises a Primary Synchronization Signal (PSS), a Secondary Synchronization Signal (SSS), and a Common Reference Signal (CRS).

7. The method of claim 6, wherein the initial synchronization message further comprises one or more of a Physical Downlink Control Channel (PDCCH) signal, a Physical Broadcast Channel (PBCH) signal, a Physical Control Format Indicator Channel (PCFICH) signal, or a Physical Hybrid Automatic Repeat Request Indicator Channel (PHICH) signal.

8. An apparatus comprising:
   a transmitter configured to transmit wireless transmissions in a plurality of subframes over a shared spectrum;
   a receiver configured to receive wireless signals in the shared spectrum;
   a modem configured to modulate signals to be transmitted and demodulate received signals; and
   a processor configured to:
      obtain data to be transmitted over the shared spectrum;
      generate a first reservation message, the first reservation message indicating that an initial synchronization message will be retransmitted as a plurality of retransmitted synchronization messages with a predetermined number of subframes between each of the plurality of retransmitted synchronization messages;
      obtain via the receiver, a second reservation message reserving a second portion of the shared spectrum for a scheduled transmission of remote synchronization messages;
      cause the transmitter to transmit the first reservation message to reserve a first portion in the shared spectrum;
      cause the transmitter to transmit the initial synchronization message and the plurality of retransmitted synchronization messages during the first portion in the shared spectrum interleaved with the remote synchronization messages during the second portion in the shared spectrum; and
      cause the transmitter to transmit the data over the shared spectrum according to timing based on the first reservation message.

9. The apparatus of claim 8, wherein the processor is configured to generate the first reservation message by generating a Clear-to-Send (CTS)-To-Self message that indicates a total number of the plurality of retransmitted synchronization messages, and the predetermined number of subframes.

10. The apparatus of claim 8, wherein the processor is further configured to cause the transmitter to transmit each of the plurality of retransmitted synchronization messages after waiting for the predetermined number of subframes.

11. The apparatus of claim 10, wherein processor is configured to cause the transmitter to transmit a third reservation comprising a Clear-to-Send (CTS)-To-Self message preceding each of the plurality of retransmitted synchronization messages.

12. The apparatus of claim 8, wherein the transmitter is configured to transmit the wireless transmissions in accordance with a Licensed Assisted Access Long Term Evolution (LAA-LTE) standard.

13. The apparatus of claim 12, wherein the processor is further configured to generate the initial synchronization message including a Primary Synchronization Signal (PSS), a Secondary Synchronization Signal (SSS), and a Common Reference Signal (CRS).

14. The apparatus of claim 13, wherein the processor is further configured to generate the initial synchronization message including one or more of a Physical Downlink Control Channel (PDCCH) signal, a Physical Broadcast Channel (PBCH) signal, a Physical Control Format Indicator Channel (PCFICH) signal, or a Physical Hybrid Automatic Repeat Request Indicator Channel (PHICH) signal.

15. A method comprising:
wirelessly receiving a first reservation message over a shared spectrum, the first reservation message indicating that an initial synchronization message for data to be transmitted over the shared spectrum in a plurality of subframes will be retransmitted as a plurality of retransmitted synchronization messages with a predetermined number of subframes between each of the plurality of retransmitted synchronization messages;
receiving a first plurality of synchronization messages over the shared spectrum, the first plurality of synchronization messages including the initial synchronization message and at least one of the plurality of retransmitted synchronization messages;
determining a timing of the plurality of subframes based on the first plurality of synchronization messages;
transmitting a further reservation message to reserve the shared spectrum and interleave a second plurality of synchronization messages with the first plurality of synchronization messages; and
receiving the data over the shared spectrum synchronized to the timing of the plurality of subframes.

16. The method of claim 15, wherein determining the timing of the plurality of subframes comprises extracting a Primary Synchronization Signal (PSS), a Secondary Synchronization Signal (SSS), and a Common Reference Signal (CRS) in accordance with a Licensed Assisted Access Long Term Evolution (LAA-LTE) standard.

17. The method of claim 16, wherein determining the timing of the plurality of subframes further comprises extracting one or more of a Physical Downlink Control Channel (PDCCH) signal, a Physical Broadcast Channel (PBCH) signal, a Physical Control Format Indicator Channel (PCFICH) signal, or a Physical Hybrid Automatic Repeat Request Indicator Channel (PHICH) signal.

18. The method of claim 15, wherein the first reservation message is a Clear-to-Send (CTS)-To-Self message and indicates a total number of the plurality of retransmitted synchronization messages, and the predetermined number of subframes.

19. The method of claim 15, wherein the transmission of each of the plurality of retransmitted synchronization messages is preceded by a transmission of a third reservation message comprising a Clear-to-Send (CTS)-To-Self message.

\* \* \* \* \*